United States Patent [19]
Maeda

[11] Patent Number: 5,802,841
[45] Date of Patent: Sep. 8, 1998

[54] GAS TURBINE COOLING SYSTEM

[75] Inventor: Fukuo Maeda, Machida, Japan

[73] Assignee: Kabushiki Kaisha Toshiba, Kawasaki, Japan

[21] Appl. No.: 756,918

[22] Filed: Dec. 2, 1996

[30]     Foreign Application Priority Data

Nov. 30, 1995  [JP]  Japan .................................. 7-312703
Feb. 29, 1996  [JP]  Japan .................................. 8-043903

[51] Int. Cl.$^6$ ....................................................... F02C 7/12
[52] U.S. Cl. ...................... 60/39.07; 60/39.182; 60/760
[58] Field of Search ............................. 60/39.07, 39.182, 60/39.55, 266, 722, 728, 760

[56]                 References Cited

U.S. PATENT DOCUMENTS

| | | | |
|---|---|---|---|
| 5,255,505 | 10/1993 | Cloyde .................................... | 60/39.07 |
| 5,394,687 | 3/1995 | Chen et al. ............................. | 60/39.07 |
| 5,581,996 | 12/1996 | Koch ........................................ | 60/266 |
| 5,640,840 | 6/1997 | Briesch .................................. | 60/39.55 |

OTHER PUBLICATIONS

ASME Paper, 92–GT–123, pp. 1–6, Jun. 1, 1992, H. Matsuzaki, et al., "Investigation of Combustion Structure Inside Low No$_x$ Combustors for a 1500 C–Class Gas Turbine".

*Primary Examiner*—Louis J. Casaregola
*Attorney, Agent, or Firm*—Oblon, Spivak, McClelland, Maier & Neustadt, P.C.

[57]                 ABSTRACT

A gas turbine plant comprises a gas turbine system provided with a compressor, a gas turbine and a generator which are mounted on a common shaft and operatively connected in series to each other, a gas turbine combustor system including a gas turbine combustor composed of an outer casing and an inner cylinder accommodated in the casing, and a cooling air circulation system operatively connected to the gas turbine combustor system for circulating cooling air. A cooling passage structure is disposed along an outer peripheral surface of the inner cylinder and a circulation line is disposed for circulating cooling air in the cooling passage structure and balancing the inner pressure of the casing of the gas turbine combustor. The cooling air circulation system includes an equalizer header unit for supplying the cooling air in the cooling passage structure to the circulation line, a heat exchanger unit for re-cooling the cooling air from the equalizer header unit and a blower unit for returning the cooling air to the cooling passage structure after the re-cooling.

17 Claims, 12 Drawing Sheets

/ # GAS TURBINE COOLING SYSTEM

BACKGROUND OF THE INVENTION

The present invention relates to a gas turbine plant adapted particularly to effectively cool an inner cylindrical member of a gas turbine combustor.

Recently, it is highly required for a gas turbine plant to be operated with high efficiency, and for such requirement, it has been studied to realize a high temperature of a combustion gas generated in a gas turbine combustor, i.e. a temperature of the combustion gas at an inlet portion of the gas turbine.

The initial object of making high the temperature at that portion can be achieved by supplying a large amount of fuel to the gas turbine combustor or by using a high calorie fuel, but such countermeasure involves a problem of generating a large amount of NOx included in an exhaust gas from the gas turbine, providing an environmental problem such as environmental pollution.

In the prior art, as a countermeasure to such environmental problem, there is provided a gas turbine combustor utilizing two-stage combustion method in which a portion of a fuel is utilized as a charcoal for a diffusion combustion and almost remaining fuel is burnt as a premix fuel in a lean-fuel state to thereby lower the combustion gas temperature and, hence, reduce the generation of NOx.

As another countermeasure, water or steam is supplied into the combustion gas to relatively lower the combustion gas temperature and, hence, reduce the generation of NOx.

However, even in the gas turbine combustor adopting such two-stage combustion method having the function suitable for achieving the conflicting objects of making high the temperature of the combustion gas and reducing the NOx generation, the following problems or defects have been provided.

Generally, the generation of NOx rapidly increases as the temperature of the combustion gas increases, and accordingly, in order to reduce the generation of NOx to an extent satisfying prescribed registrations or law, it is necessary to lower the combustion gas temperature. One method for lowering the combustion gas temperature is a premix combustion method, and the premix combustion method for suppressing the generation of NOx has a condition closely related to a film cooling air amount for cooling a wall section of the combustor of the gas turbine.

FIG. 14 is a graph showing the relation between the cooling air amount rate (axis of ordinate) and the gas temperature at a gas turbine inlet, i.e. temperature at an outlet of a combustor (axis of abscissa), and a premix combustion equivalent ratio is utilized as parameter (theoretical fuel-air ratio to actual fuel-air ratio). In order to suppress the generation of NOx, it is necessary to select condition for the combustion having the equivalent ratio less than 0.6. When this ratio exceeds the value of 0.6, the generation of NOx rapidly increases.

As can be seen from FIG. 14, as the combustion gas temperature of the gas turbine increases, the cooling air rate decreases, and for example, in the case of the combustion gas temperature at the inlet portion of the gas turbine of about 1600° C., the cooling air rate becomes zero. This tendency is made remarkable as the premix combustion equivalent ratio decreases. That is, the selection of the combustion condition for realizing the high temperature of the gas turbine and the reduction of the NOx generation means the violent reduction of the film cooling air amount for cooling the wall section of the combustor, and accordingly, there is provided a problem of the wall surface cooling.

As described above, the realization of the high temperature of the combustion gas generated in the gas turbine combustor (temperature at the combustor outlet portion) for the purpose of achieving high operation efficiency of the gas turbine requires the cooling of the gas turbine combustor itself, and in consideration of the difficulty of the sufficient cooling thereof, the prior art provides a cooling structure such as shown in FIG. 15.

Referring to FIG. 15, a combustor 1 is disposed between a compressor and a gas turbine, both not shown, and is operated by utilizing a highly pressurized air (high pressure air called hereunder) as combustion air from the compressor. A fuel is supplied to the combustion air to thereby generate a combustion gas which is then supplied to the gas turbine.

The gas turbine combustor 1 is composed of, as illustrated in FIG. 15, a casing 2 and an inner cylinder 3 accommodated in the casing 2 coaxially therewith. A flow sleeve 4 is arranged between the casing 2 and the inner cylinder 3 to define the combustion air passage 5 to guide the high pressure air as the combustion air to a nozzle 6 of the inner cylinder 3 at which the combustion air is mixed with a fuel, and a combustion gas is then generated.

A plurality of projection pieces 7 are provided to the outer peripheral surface of the inner cylinder 3 so as to project towards the combustion air passage 5, and when the high pressure air as the combustion air passes the combustion air passage 5, it forcibly collides with the projection pieces 7 to thereby generate turbulent flow of the air to increase a heat transfer efficiency, and under the increased heat transfer efficiency, the combustion air is utilized for cooling the inner cylinder 3 which is exposed to a high temperature circumstance.

With the gas turbine combustor 1 having the cooling passage structure mentioned above, however, since the high pressure air composed of the combustion air and the cooling air is used for improving the cooling function, when the high pressure air collides with the projection pieces 7, the pressure loss is caused to the air flow, and furthermore, when the cooling air passes along the wall surface of the inner cylinder 3, the friction coefficient increases, leading to the increasing of the pressure loss, which finally results in the lowering of the heat transfer coefficient entirely in the gas turbine plant.

SUMMARY OF THE INVENTION

An object of the present invention is to substantially eliminate defects or drawbacks encountered in the prior art described above and to provide a gas turbine plant capable of effectively utilizing the limited high pressure air from the compressor as the cooling air with the reduced pressure loss and effectively cooling the gas turbine combustor.

This and other objects can be achieved according to the present invention by providing a gas turbine plant comprising:

a gas turbine system provided with a compressor, a gas turbine and a generator which are mounted on a common shaft and operatively connected in series to each other;

a gas turbine combustor system including a gas turbine combustor composed of an outer casing and an inner cylinder accommodated in the casing; and a cooling air circulation system operatively connected to the gas turbine combustor system for circulating a cooling air, wherein a cooling passage structure is disposed along an outer peripheral surface of the inner cylinder and a circulation line is disposed for circulating a cooling air in the cooling passage structure and making balance a pressure to an inner pressure of the casing of the gas turbine combustor and wherein the cooling air circulation system includes an equalizer header unit for supplying the cooling air in the cooling passage structure to the circulation line, a heat exchanger unit for re-cooling the cooling air from the equalizer header unit and a blower unit for returning the cooling air to the cooling passage structure after the re-cooling.

In preferred embodiments, the inner cylinder is composed of a combustion section and a transition piece section and the cooling passage structure is applied to at least one of the combustion section and the transition piece section of the inner cylinder. The inner cylinder is formed with film cooling holes through which the cooling air in the cooling passage structure and a high pressure air in the casing are guided in shape of film.

The equalizer header unit is composed of a closed chamber having one and another longitudinal end portions, an equalizer duct disposed to one end portion of the closed chamber so as to communicate with the casing of the gas turbine combustor, a cooling air duct disposed to one end portion the the closed chamber so as to communicate with the cooling passage structure, and an outlet formed to the another end portion of the closed chamber so as to feed the cooling air passing through the cooling air duct to the circulation line.

A steam turbine system may be operatively connected to the cooling air circulation system, and a cooling medium supplied, through the steam turbine system, to the heat exchanger unit of the cooling air circulation system is either one of condensed water, supply water, sea water and fuel.

The heat exchanger unit is operatively connected to the steam turbine system through a supply tube through which the cooling medium is supplied and a recovery tube through which a heated cooling medium is returned to the steam turbine system. A cooling medium supplied to the heat exchanger unit of the cooling air circulation system is a cooling water from another gas turbine plant.

The cooling passage structure is divided into an inlet chamber and an outlet chamber by a partition plate extending in a direction along the cooling air flow direction in the cooling passage structure and formed with air jetting holes through which the cooling air flows from the inlet chamber towards the outlet chamber and the inlet and outlet chambers are mounted with manifolds, respectively. The cooling passage structure may be divided into an inlet chamber and an outlet chamber by a partition plate extending in a direction along the cooling air flow in the cooling passage structure so as to provide a reverse cooling passage in which the cooling air from the inlet chamber flows in the outlet chamber in a direction reverse to a flow direction in the inlet chamber and the inlet and outlet chambers are mounted with manifolds, respectively.

The cooling passage structure is provided with a turbulent flow accelerating member formed to an outer peripheral surface of the inner cylinder. The turbulent flow accelerating member comprises either one of a plurality of ribs and fins disposed with a space from each other. Each of the ribs or fins has a tree-shaped structure, along the cooling air flow, composed of a main piece and a plurality of branched pieces branched from the main piece.

The cooling passage structure is formed of a member expandable and contractible in accordance with thermal expansion and contraction of the inner cylinder and a seal ring is disposed to one end portion of the cooling passage structure to be movable.

The equalizer header unit is provided with a closed chamber having one and another longitudinal end portions, and the closed chamber is divided into a plurality of sections which are separated by perforated partition plates.

The blower unit is provided with a closed chamber for achieving a pressure balance to the equalizer header unit and a blower is disposed in the closed chamber.

A pressure sensor may be further disposed to the casing of the gas turbine combustor and a function generator may be also operatively connected to the pressure sensor and the blower unit to operate the blower unit in response to a pressure change in the casing. The pressure sensor is incorporated in the cooling air circulation line.

According to the embodiments of the present invention, as described above, the cooling passage structure is disposed along an outer peripheral surface of the inner cylinder and a circulation line is disposed for circulating a cooling air in the cooling passage structure and making balance a pressure to an inner pressure of the casing of the gas turbine combustor. The cooling air circulation system includes an equalizer header unit for supplying the cooling air in the cooling passage structure to the circulation line, a heat exchanger unit for re-cooling the cooling air from the equalizer header unit and a blower unit for returning the cooling air to the cooling passage structure after the re-cooling. Accordingly, the inner cylinder can be effectively cooled with relatively small amount of the cooling air with less pressure loss of the cooling air.

Furthermore, the equalizer header unit is composed of a closed chamber having one and another longitudinal end portions, an equalizer duct disposed to one end portion of the closed chamber so as to communicate with the casing of the gas turbine combustor, a cooling air duct disposed to one end portion the the closed chamber so as to communicate with the cooling passage structure and an outlet formed to the another end portion of the closed chamber so as to feed the cooling air passing through the cooling air duct to the circulation line. The closed chamber may be divided into a plurality of sections which are separated by perforated partition plates. Therefore, the pressure in the casing can be balanced to the pressure in the sections of the closed chamber, and the cooling air from the cooling passage structure can be circulated in the circulation line under a stable condition.

According to the location of the heat exchanger unit in the circulation line, the heat of the cooling air can be effectively recovered to another plant. According to the location of the film holes, the cooling air can be relatively easily supplied to members or portions to which the cooling air is generally not easily supplied, thus maintaining the strength of the inner cylinder.

Furthermore, according to the present invention, since the partition plate is provided in the cooling air structure to divide the inside thereof into an inlet chamber and an outlet chamber to perform the impinge cooling or convention cooling, and the manifolds are mounted to these inlet and outlet chambers, respectively, the cooling passage structure can be effectively cooled with the improved high heat transfer efficiency, and the manifold assembling working can be relatively easily performed.

The location of the turbulent flow accelerating member can perform the improved convention cooling.

Since the cooling passage structure can be formed of an expandable and contractible member, the thermal expansion or contraction of the inner cylinder can be absorbed, thus avoiding the damage due to the excessive thermal stress.

Still furthermore, since the blower unit is provided with a closed chamber for achieving a pressure balance to the equalizer header unit and a blower is disposed in the closed chamber, the blower can be driven with a reduced power to circulate the cooling air to the cooling passage structure.

A pressure sensor may be further disposed to the casing of the gas turbine combustor and a function generator may be also operatively connected to the pressure sensor and the blower unit to operate the blower unit in response to a pressure change in the casing. The pressure sensor is incorporated in the cooling air circulation line. The location of the function generator make it possible to automatically operate the blower.

The nature and further characteristic features of the present invention will be further made clear from the following description made with reference to the accompanying drawings.

DESCRIPTION OF THE PREFERRED EMBODIMENTS

Preferred embodiments of the gas turbine plant according to the present invention will be described hereunder with reference to the accompanying drawings.

Figure 1:
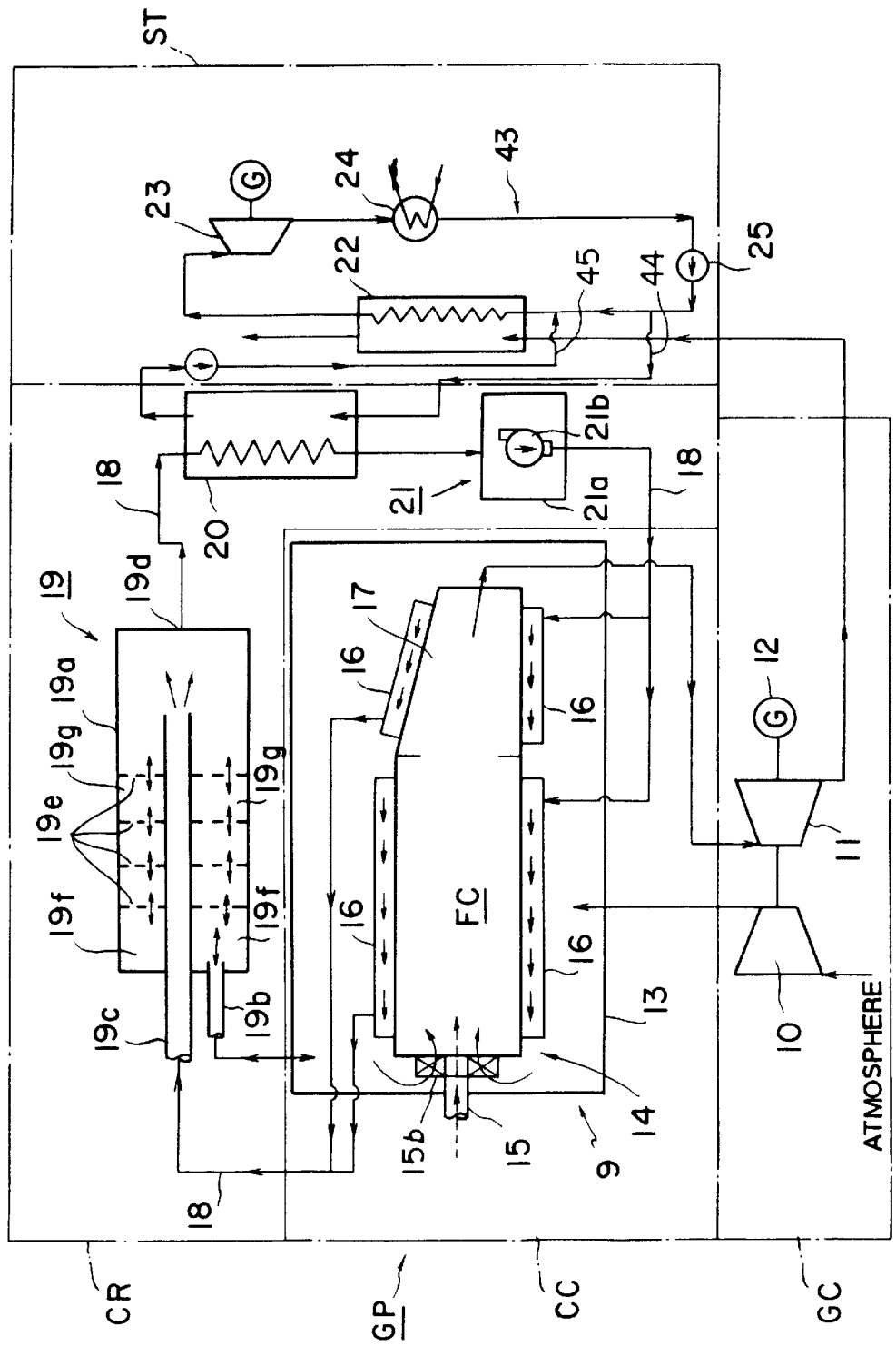
FIG. 1 is a schematic system diagram of a gas turbine plant according to a first embodiment of the present invention.

First, referring to FIG. 1 showing a first embodiment of the present invention, a gas turbine plant denoted entirely by reference character GP is composed of a gas turbine system GC, a gas turbine combustor system CC, a cooling air circulation system CR and a steam cycle system ST.

The gas turbine system GC comprises a compressor 10, a gas turbine 11 and a generator 12 which are mounted in a series arrangement on a common shaft.

The gas turbine combustor system CC is provided with a gas turbine combustor 9 and an inner cylinder 14 coaxially accommodated in a casing 13 of the combustor 9. A fuel nozzle 15 is disposed to a head side portion of the inner cylinder 14, and cooling passages 16, 16 each in shape of sleeve is formed along the outer peripheral surface of the inner cylinder 14. The inner cylinder 14 is divided into a combustion area or section FC adapted to mix the fuel from the fuel nozzle 15 with the combustion air to thereby generate a combustion gas and a transition piece 17 adapted to supply therethrough the combustion gas from the combustion area FC to the gas turbine 11. The cooling passages 16, 16 are utilized selectively for the combustion area FC and the transition piece 17.

The cooling air circulation system CR has a circulation line 18 connected to the cooling passages 16, 16 of the gas turbine combustor system CC, and there are mounted, to the circulation line 18, an equalizer header unit 19 for balancing the pressure to the pressure in the casing 13 of the combustion system CC, a heat exchanger unit 20 for re-cooling the cooling air through the equalizer header unit 19 and a blower unit 21 for circulating the re-cooling air to the cooling passages 16, 16 of the combustion system CC for compensating for the pressure loss caused at the re-cooling time in the heat exchanger unit 20.

The steam cycle system ST is composed of steam turbine plant 43 comprising a steam generator 22, a steam turbine 23, a condenser 24, a water supply pump 25. In the steam cycle system ST, a steam is generated through the steam generator 22 by utilizing a waste heat from the gas turbine 11 of the gas turbine system GC and the thus generated steam is supplied to the steam turbine 23 to obtain a power through expansion of the steam. The steam is thereafter cooled in the condenser 24 to a condensed water or supply water, which is then circulated to the steam generator 22 through a water supply pump 25. The water on the outlet side of the pump 25 is guided to the heat exchanger unit 20 of the cooling air circulation system CR through a supply line 44 as a cooling medium, and in the heat exchanger unit 20, the water is heated to a high temperature. Thereafter, the waste heat of the gas turbine is recovered to the steam generator 22 through a recovery line 45.

The equalizer header unit 19 of the cooling air circulation system CR is composed of a closed chamber 19a, which has one longitudinal end portion to which are mounted an equalizer duct 19b communicated with the casing 13 and a cooling air duct 19c communicated with the cooling air passages 16, 16 disposed along the inner cylinder 14 of the gas turbine combustor system CC. The closed chamber 19a also has another one longitudinal end portion to which is formed an outlet 19d through which the cooling air from the cooling air duct 19c is guided to the heat exchanger unit 20. The closed chamber 19a is divided into sections 19f and 19g by perforated plates 19e, and the sections 19f and 19g are adapted to balance the air pressure to the inner pressure of the casing 13.

The closed chamber 19a is divided into the sections 19f and 19g for the purpose of gradually reducing the pressure of the high pressure air from the casing 13 under the steady operation of the gas turbine plant to thereby prevent the high pressure air from mixing with the cooling air from the cooling air duct 19c at the outlet portion 19d of the closed chamber 19a. As a result, when the pressure in the casing 13 is constant, the high pressure air in the casing 13 does not flow into the closed chamber 19a of the equalizer header unit 19 and only the cooling air of the cooling air duct 19c flows in the circulation line 18.

In the case where the load in the gas turbine varies and the pressure in the casing is hence changed, the high pressure air flows in and out in a repeated manner between the casing 13 and the closed chamber 19a by means of the equalizer duct 19b. Accordingly, the equalizer duct 19b has a function of making automatically balance the pressure between the casing 13 and the closed chamber 19a of the equalizer unit 19.

As described above, because of the automatic pressure balance in the casing 13 and the closed chamber 19a, the cooling passages 16, 16 can be designed easily with desired pressure resistance and strength, the reliability in operation can be improved, and the power for a blower 21b can be reduced as described below.

The blower unit 21 incorporated in the circulation line 18 of the cooling air circulation system CR is composed of a closed chamber 21a in which the blower 21b is accommodated. The closed chamber 21a is disposed for the purpose of making balance a pressure to the inner pressure of the equalizer header unit 19. When the blower 21b is set in an open-air state, the blower 21b requires much power for increasing the pressure at the time of the circulation of the cooling air to the cooling passages 16, 16. However, as mentioned above, in the condition of the automatic pressure balance between the casing 13 and the closed chamber 19a of the equalizer header unit 19, it is only necessary to compensate for the pressure loss of the cooling air at the time of supplying the air to the cooling passages 16, 16. Accordingly, the blower 21b consumes only a power corresponding to the pressure loss of the cooling air at the time of the circulation to the cooling passages 16, 16, thus realizing the reduction of the power consumption.

The gas turbine plant of the structure described above will achieve the following operations and functions.

The compressor 10 of the gas turbine system GC becomes a high pressure state by sucking air due to rotational torque of the gas turbine 11 and the highly pressurized air (high pressure air) is supplied to the gas turbine combustor 9 as a combustion gas.

The high pressure gas as the combustion air to be supplied to the casing 13 is mixed with the fuel from the fuel nozzle 15 and the combustion gas is generated in the combustion area FC. The combustion gas is supplied to the gas turbine 11 from the combustion area FC through the transition piece 17, and in the gas turbine 11, the rotational torque is obtained through the expansion of the combustion gas to thereby rotate the generator 12 and obtain an electric power.

A portion of the high pressure air as the combustion air supplied to the casing 13 is guided to the section 19f of the equalizer header unit 19 through the equalizer duct 19b of the cooling air circulation system CR, so that the pressure of the air is balanced to the inner pressure of the casing 13. That is, the high pressure air guided in the section 19f is once enclosed therein to maintain the balanced condition to the pressure in the casing 13, a portion of the high pressure air is reduced in pressure in the respective sections 19f and 19g defined by the perforated plates 19e, and it finally acts as a barrier in the section 19g to suppress the flowing of the air to the outlet 19d of the equalizer header unit 19.

However, in the case, such as in the operation starting time, at which the pressure difference between the inner pressure of the casing 13 and the inner pressure of the sections 19f and 19g of the closed chamber 19a is extremely high, the high pressure air flows out through the final section 19g and is used as a cooling air for the cooling passages 16, 16 of the gas turbine combustor system CC. When the gas turbine combustor 9 reaches a steady operation, the inner pressures of the casing 13 and the sections 19f and 19g are balanced, so that the high pressure air is only enclosed in the section 19f. However, when the operation mode is changed such as in a load change, the high pressure air in the sections 19f and 19g returns to the casing 13, whereby, in such case, the pressures in the casing 13 and the equalizer header unit 19 are always kept in the balanced condition.

The cooling air from the outlet 19d of the equalizer header unit 19 is guided to the heat exchanger unit 20 through the circulation line 18, in which the heat exchange, i.e. transfer, between the cooling air and the condensed water (supply water) from the steam cycle system ST is performed and the re-cooled air is guided to the closed chamber 21a of the blower unit 21. In this circulation, the total heat amount of the cooling air re-cooled in the heat exchanger unit 20 includes a consuming power of the blower 21b (mechanical heat loss of the blower 21b) in addition to a heat absorbed during the passing through the cooling passages 16, 16, so that the total heat amount is relatively high. The condensed water (supply water) from the steam cycle system ST contacting the cooling air having relatively high heat amount can absorb a large amount of the heat through the heat exchanging operation. Accordingly, the condensed water (supply water) absorbing such high heat amount is increased in its temperature to a degree corresponding to the absorbing heat amount, so that the fuel to be supplied to the steam cycle system ST can be saved, thus improving the heat efficiency of the entire turbine plant.

The closed chamber 21a of the blower unit 21 is constructed so that the pressure therein is balanced to the pressure in the equalizer header unit 19, and for this reason, the blower 21b only acts to compensate for the pressure loss at the time of supplying the cooling air after the re-cooling to the cooling passages 16, 16 of the gas turbine combustor system CC.

As described above, the cooling air from the blower 21b cools the wall of the combustion area FC of the inner cylinder 14 and the transition piece 17 during the passing through the cooling passages 16, 16, and after the cooling, returns to the cooling air duct 19c of the equalizer header unit 19 through the circulation line 18. The cooling of the inner cylinder 14 is continuously performed by repeating the above circulation of the air. Therefore, according to the gas turbine plant of the structure of the present invention described above, since the pressure balance between the casing 13 of the gas turbine combustor system CC and the cooling air circulation system CR can be realized, the cooling air circulation through the cooling passages 16, 16 can be done with extremely reduced power.

Figure 15:
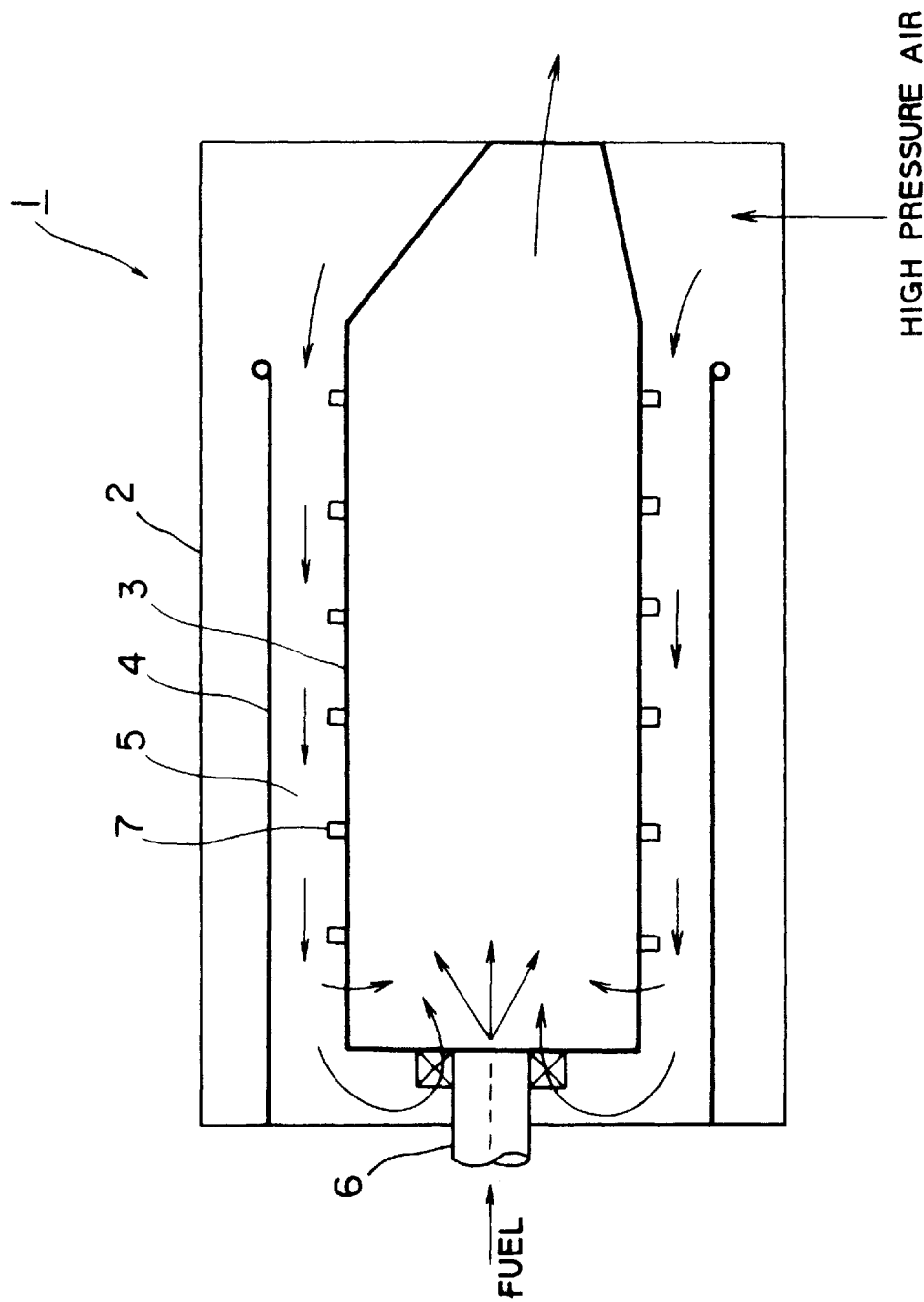
FIG. 15 is a schematic diagram showing a gas turbine combustor of a conventional general structure.

Furthermore, according to the gas turbine plant of the present invention, the cooling air circulating the cooling passages 16, 16 of the combustor system CC is circulated by the operation of the blower 21b through a line different from the flow of the high pressure air of the gas turbine system GC. That is, the pressure loss of the cooling air (i.e. driving power of the blower 21b) consumed for the circulation of the cooling air has no relation to the pressure loss of the high pressure air drained from the compressor 10 of the gas turbine system GC. Accordingly, different from the conventional structure shown in FIG. 15, the pressure loss of the cooling air cooling the inner cylinder 14 of the gas turbine combustor 9 is extremely small, and hence, the total pressure loss of the combustor 9 can be minimally reduced and the heat efficiency of the gas turbine plant can be improved.

Figure 2:
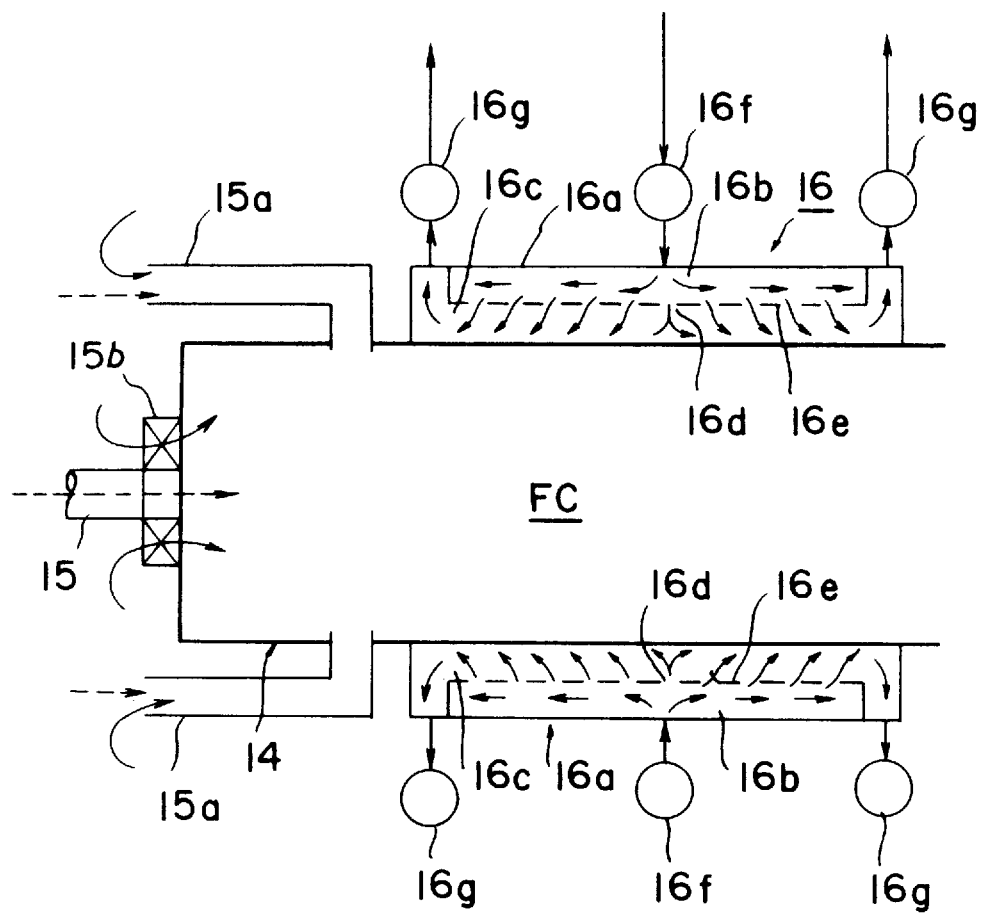
FIG. 2 is a schematic view showing a first example of a cooling passage of the gas turbine plant.

FIG. 2 shows a schematic diagram of a first example for an impinge cooling of a cooling passage 16a along the combustion area FC.

Referring to FIG. 2, in the inner cylinder 14, a combustion area FC in which combustion gas is generated is formed, and in this combustion area FC, a gyrating air from a swirler 15b is added to the fuel from the fuel nozzle 15 to perform a primary combustion and then perform a secondary combustion by further adding a diluted fuel from a premix nozzle 15a, thus generating a combustion gas.

The combustion area cooling passage 16a in shape of sleeve is arranged on the outer wall side of the combustion area FC. This cooling air passage 16a is provided with inlet and outlet chambers 16b and 16c both in annular or sleeve shape, which are divided by a partition plate 16e having porous or punched jetting ports 16d and extending in the axial direction of the inner cylinder so as to provide an outer peripheral side inlet chamber 16b and inner peripheral side outlet chamber 16c. The inlet chamber 16b is provided with an inlet manifold 16f and the outlet chamber 16c is provided with an outlet manifold 16g.

In the combustion area cooling passage 16a having the structure described above, the cooling air pressure is made uniform by the inlet manifold 16f, the cooling air is jetted through the jetting ports 16d towards the wall surface of the combustion area FC, and after the collision with the wall, the cooling air flows from the outlet chamber 16c through the manifold 16g, by which the air pressure is again made uniform. Accordingly, since the impinge cooling of the cooling passage 16a is performed through the collision of the jetted cooling air with the uniform cooling air pressure being maintained, the wall surface of the combustion area FC of the inner cylinder 14 can be entirely uniformly cooled.

Figure 3:
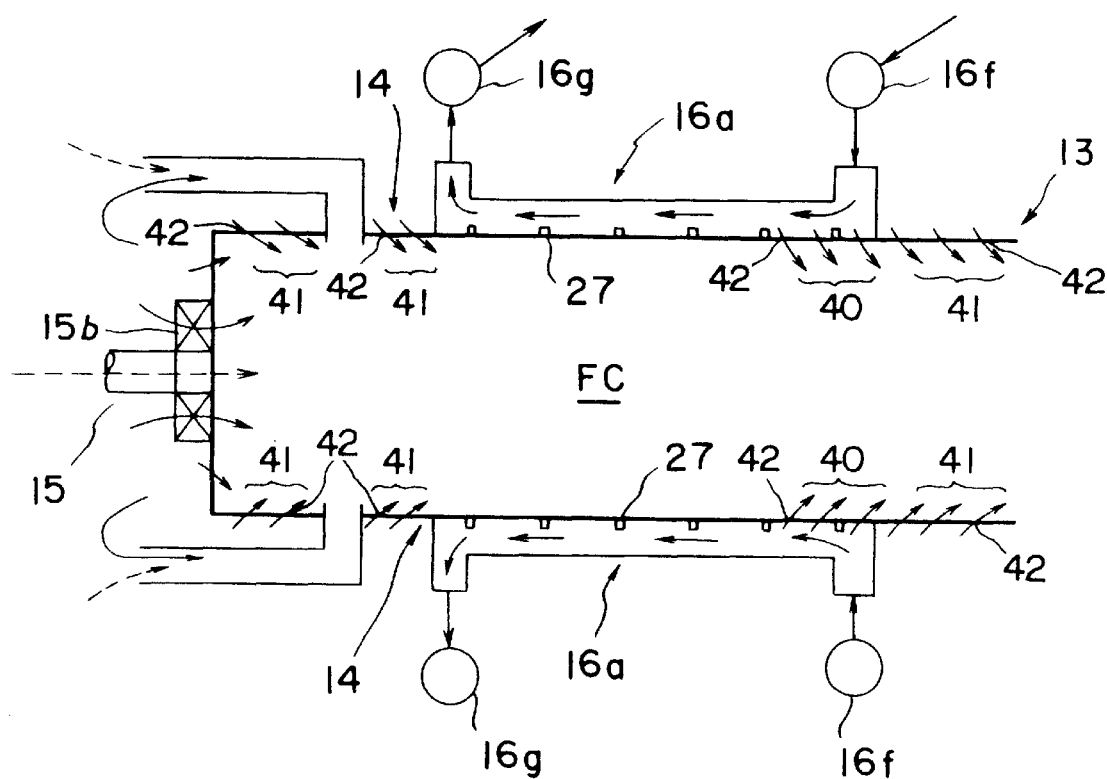
FIG. 3 is a schematic view showing a second example of a cooling passage of the gas turbine plant.
Figure 4:
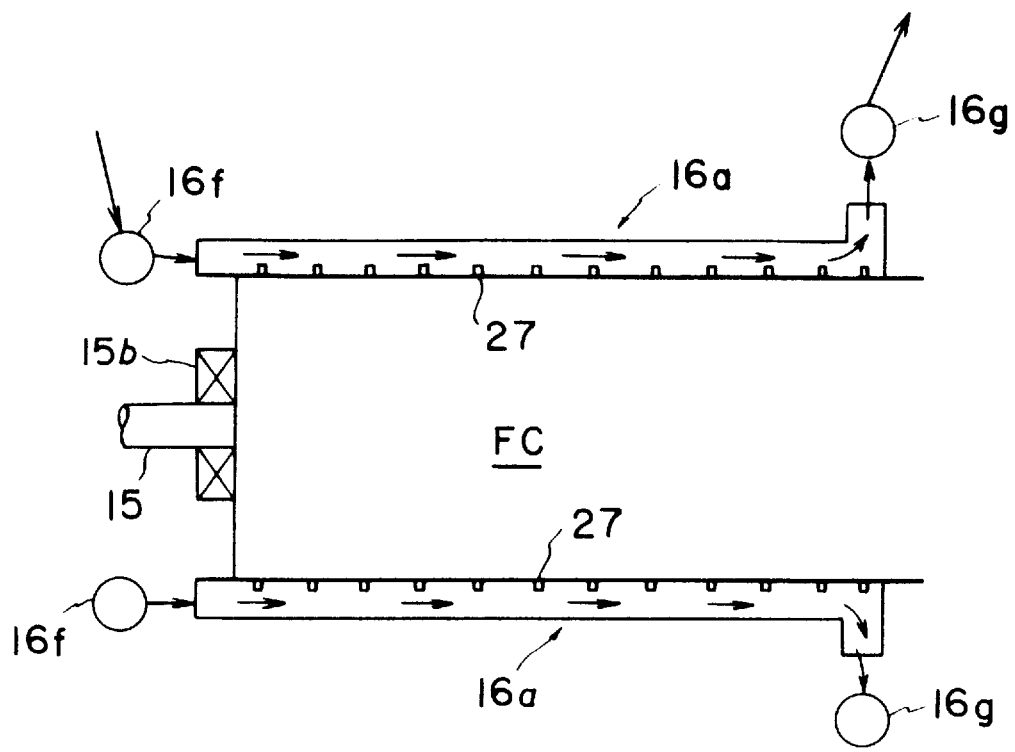
FIG. 4 is a schematic view showing a third example of a cooling passage of the gas turbine plant.
Figure 5:
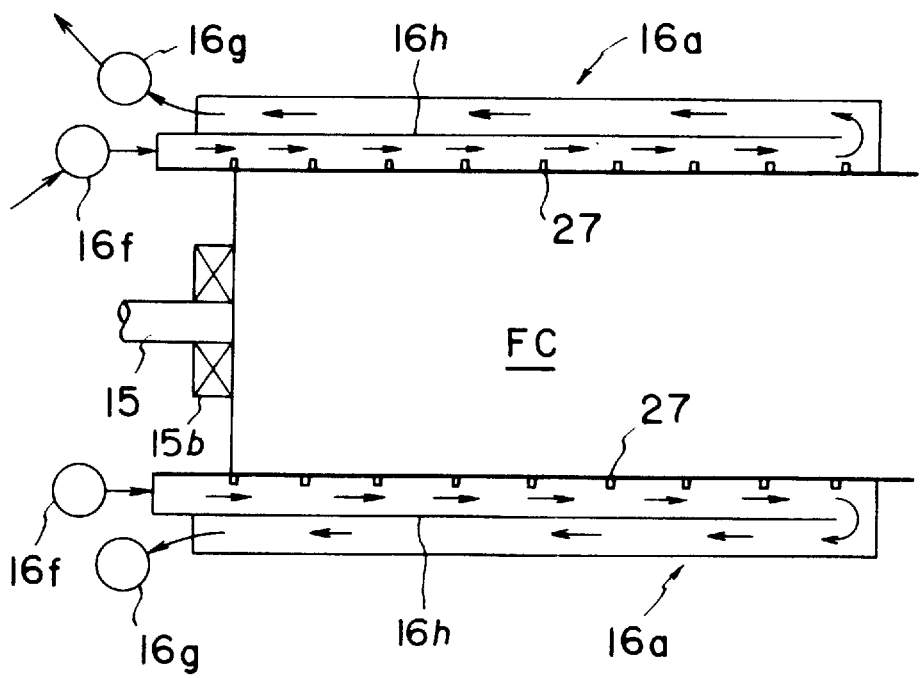
FIG. 5 is a schematic view showing a fourth example of a cooling passage of the gas turbine plant.

FIGS. 3, 4 and 5 represents second, third and fourth examples of the combustion area cooling passage 16a of the cooling passages 16, 16.

These examples are different from the impinge cooling of the first example, and in these examples, convection cooling is performed. That is, in the structures of the examples of FIGS. 3, 4 and 5, members 27 for accelerating or promoting turbulent flow such as ribs or fins are mounted to the combustion area cooling passages 16a, respectively. According to the provision of such turbulent flow accelerating members 27, the cooling air flow is disturbed and the heat transfer coefficiency can be improved. Accordingly, since the wall surface of the combustion area FC of the inner cylinder 14 can be effectively cooled by the cooling air having the improved heat transfer coefficiency, the wall surface can be cooled with an improved cooling performance.

With reference to the structure of FIG. 3, film cooling holes 42 are formed to the wall section of the inner cylinder 14 to make it possible to perform the film cooling to a portion of the wall section of the inner cylinder 14. The inner cylinder 14 is mounted with a flame propagation tube, a flame detector and a connection member for the transition piece at portions except the combustion area cooling passage 16a. In such arrangement, in spite of the fact that the portions to which these elements are mounted are exposed to a high temperature combustion gas and are thus in a severe atmosphere, it is difficult to cool these portions in the conventional structure.

On the other hand, according to the example of the present invention, since the high pressure air of the casing 13 flows as cooling air through the film cooling holes 42 inside the inner cylinder 14 along the wall surface thereof, the above elements can be effectively cooled. Furthermore, when the film cooling hole 42 is also formed to a portion of the combustion area cooling passage 16a, the cooling air 40 flows along the wall surface of the end region of the combustion area cooling passage 16a. In such arrangement, the cooling effect will be further improved, particularly, in the case of less amount of the cooling air 40.

With reference to the example of FIG. 5, a partition plate 16h is disposed in the combustion area cooling passage 16a along the outer peripheral surface of the inner cylinder 14 so as to divide the passage 16a to an inlet chamber 16b and an outlet chamber 16c to provide a reverse flow-type cooling passage structure. An inlet manifold 16f and an outlet manifold 16g are mounted to the inlet chamber 16b and the outlet chamber 16c, respectively.

According to the example of FIG. 5, since the cooling passage 16a is formed as the reverse flow-type cooling passage in which the cooling air flows in a snaking fashion, a pulsation of the cooling air during the snaking flow can be reduced. Furthermore, according to this reverse flow-type cooling passage structure, it is possible to locate the inlet and outlet manifolds 16f and 16g for the inlet and outlet chambers 16b and 16c at adjacent positions, so that the mounting and assembling working can be done easily. Still furthermore, in the gas turbine plant of the present invention, a plurality of, for example, eighteen combustors 9 are arranged, one inlet manifold 16f and one outlet manifold 16g can be utilized for a plurality of inlet chambers 16b and outlet chambers 16c of the respective combustors 9, thus easily performing the mounting and assembling workings thereof.

Figure 6:
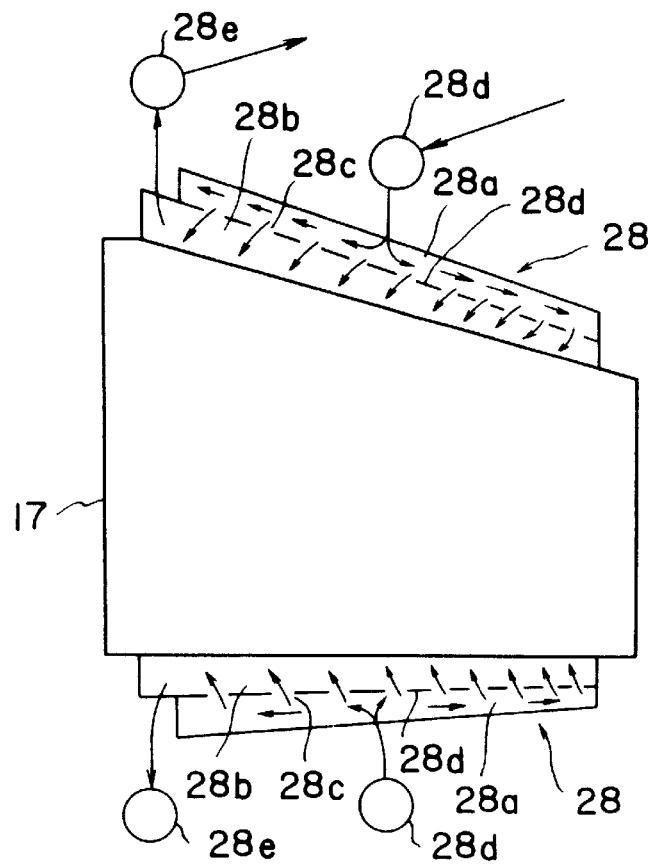
FIG. 6 is a schematic view showing one example of a transition piece of the gas turbine plant.
Figure 7:
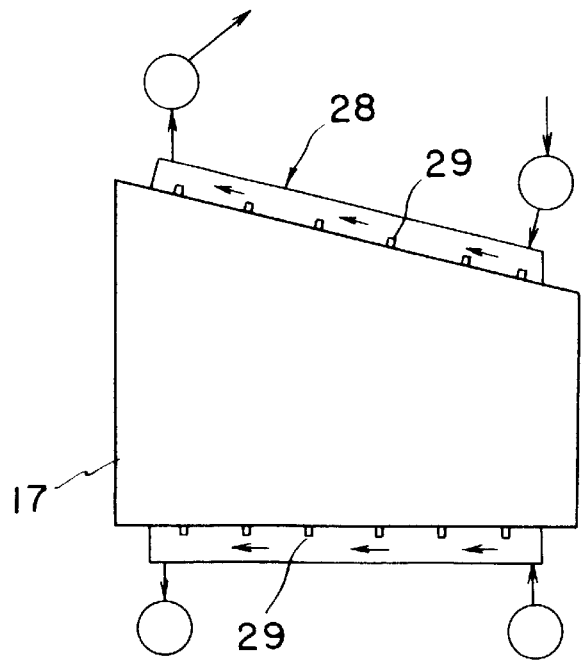
FIG. 7 is a schematic view showing another example of a transition piece of the gas turbine plant.

FIGS. 6 and 7 are schematic diagrams representing first and second examples of the location of a transition piece cooling passage 28 for the transition piece 17.

These examples have structures of impinge cooling system and convection cooling system for improving the cooling performance of the transition piece 17.

That is, the example of FIG. 6 adopts the impinge cooling system and the example of FIG. 4 adopts the convection cooling system, both requiring the cooling improvement for the transition piece 17 exposed to the high temperature combustion gas.

Referring to the example of FIG. 6, a transition piece cooling passage 28 having, for example, a sleeve shape and disposed on the outer periphery side of the transition piece 17. The transition piece cooling passage 28 is provided with inlet and outlet chambers 28a and 28b both in annular or sleeve shape, which are divided by a partition plate 28d formed with perforated or punched jetting ports 28c into an outer peripheral side inlet chamber 28a and an inner peripheral side outlet chamber 28b. The inlet and outlet chambers 28a and 28b are mounted with an inlet manifold 28d and an outlet manifold 28e, respectively.

According to such structure of the example of FIG. 6, the impinging cooling performance can be further improved, and in addition, the homogenization of the pressure of the cooling air can be made.

Referring to the example of FIG. 7, a turbulent flow accelerating member 29 is located inside the transition piece cooling passage 28 to thereby improve the heat transfer coefficient and to improve the cooling performance thereof through the convection cooling.

Figure 8:
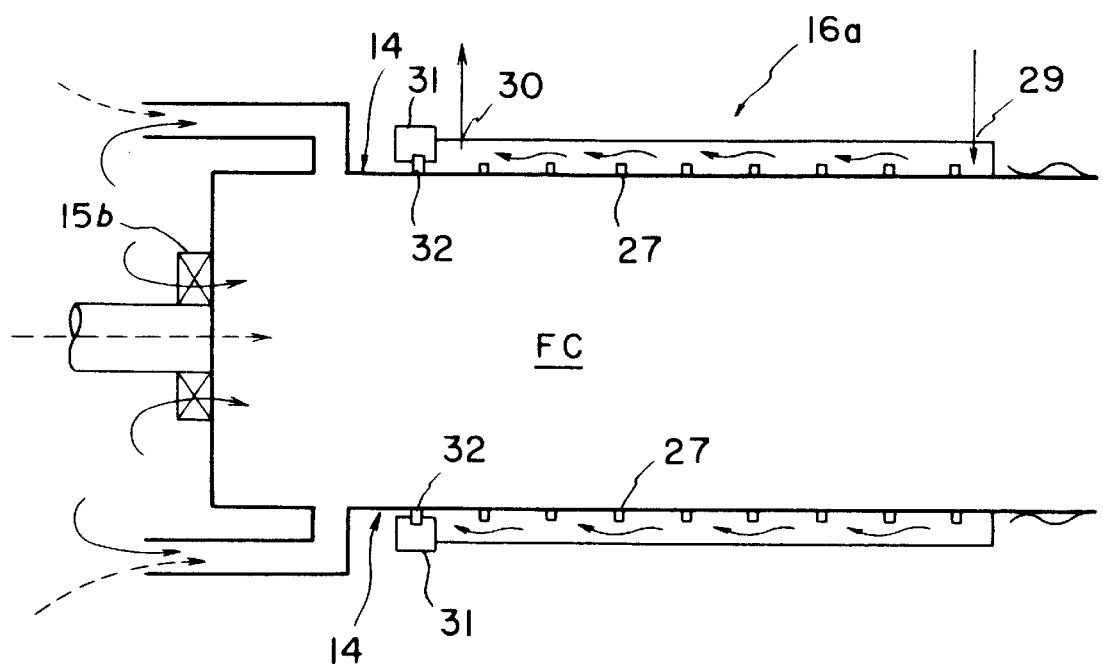
FIG. 8 is a schematic view showing a fifth example of a cooling passage of the gas turbine plant.

FIG. 8 is a schematic diagram representing a fifth example of the combustion area cooling passage of the cooling passage 16.

In a certain case, the inner cylinder 14 is expanded or contracted due to the direct heat of the high temperature gas in the combustion area FC. For this reason, in this example of FIG. 5, the combustion area cooling passage 16a is formed of a expandable member so as to associate with the expansion or contraction of the inner cylinder 14 and a seal ring 32 is mounted to a ring holder 31 to follow the movement of the expandable member during the passing of the cooling air from the inlet end 29 of the cooling passage 16a to the outlet end 30 thereof through the turbulent flow accelerating member 27.

According to this structure, the combustion area cooling passage 16a can be also expanded or contracted to thereby avoid the generation of excessive thermal stress due to the temperature difference between the cooling passage 16a and the inner cylinder 14, ensuring the safeness of the material strength.

Figure 9:
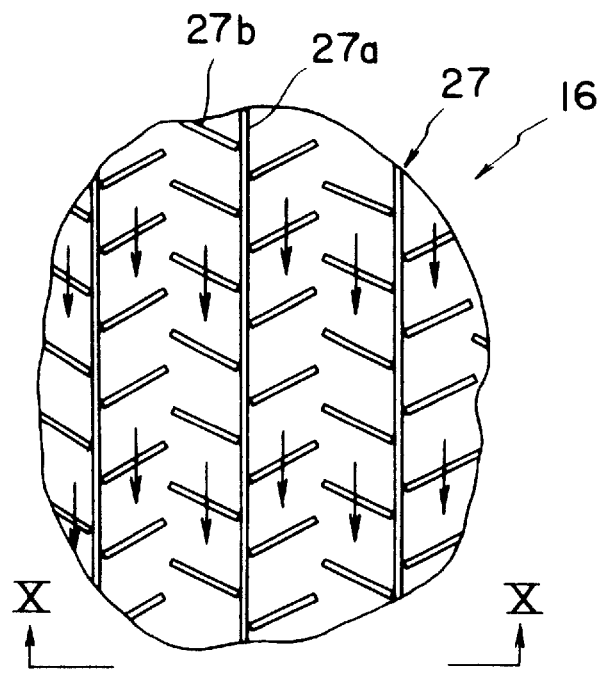
FIG. 9 is a schematic view showing a portion of a turbulent flow generating structure of a sixth example of a cooling passage of the gas turbine plant.
Figure 10:
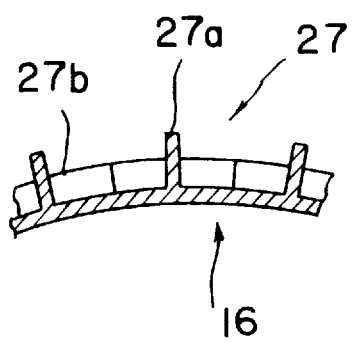
FIG. 10 is a view seen from a direction X—X in FIG. 9.

FIGS. 9 and 10 represent a sixth example of the cooling passage 16, in which ribs or fins are adapted as the turbulent flow accelerating member 27 provided for the cooling passage 16. These ribs or fins are arranged in shape of tree along the cooling air flow passage as shown by arrows and composed of main pieces 27a and branched pieces 27b.

According to this structure, since the cooling air flows while colliding with the main pieces 27a and the branched pieces 27b of the turbulent flow accelerating member 27, the heat transfer efficiency is improved and the cooling performance can be hence improved.

Figure 11:
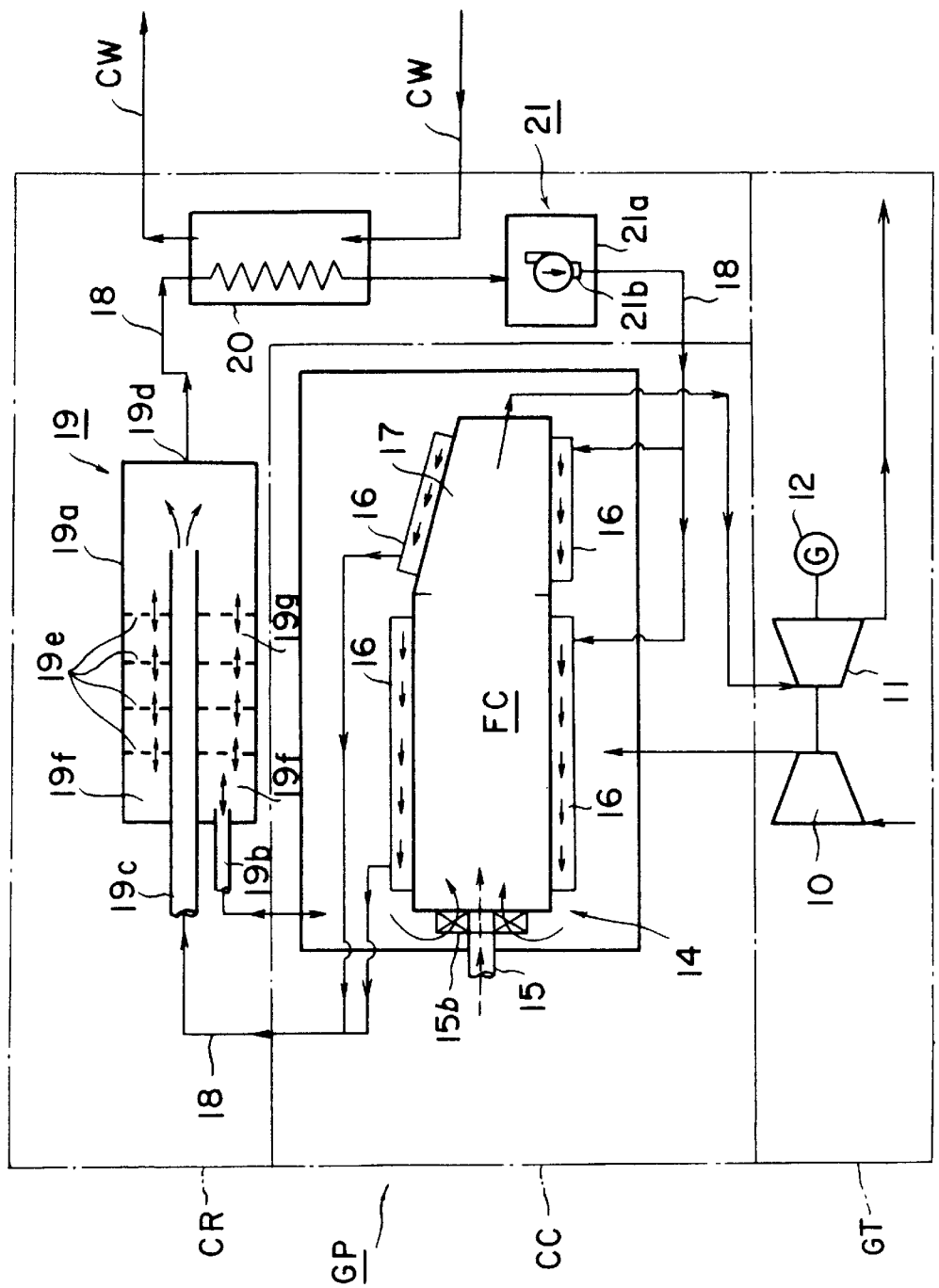
FIG. 11 is a schematic system diagram of a gas turbine plant according to a second embodiment of the present invention.

FIG. 11 is a schematic diagram representing a second embodiment of a gas turbine plant according to the present invention.

This second embodiment utilizes sea water, fuel or cooling water of another plant as a cooling medium CW for a heat exchanger unit 20 of a cooling air circulation system CR, and in this point, the second embodiment differs from the first embodiment in which the condensed water (supply water) of the steam cycle system ST is utilized. The other structures of the second embodiment are substantially the same as those of the first embodiment and both the embodiments are effective in the point of the heat recovery.

Figure 12:
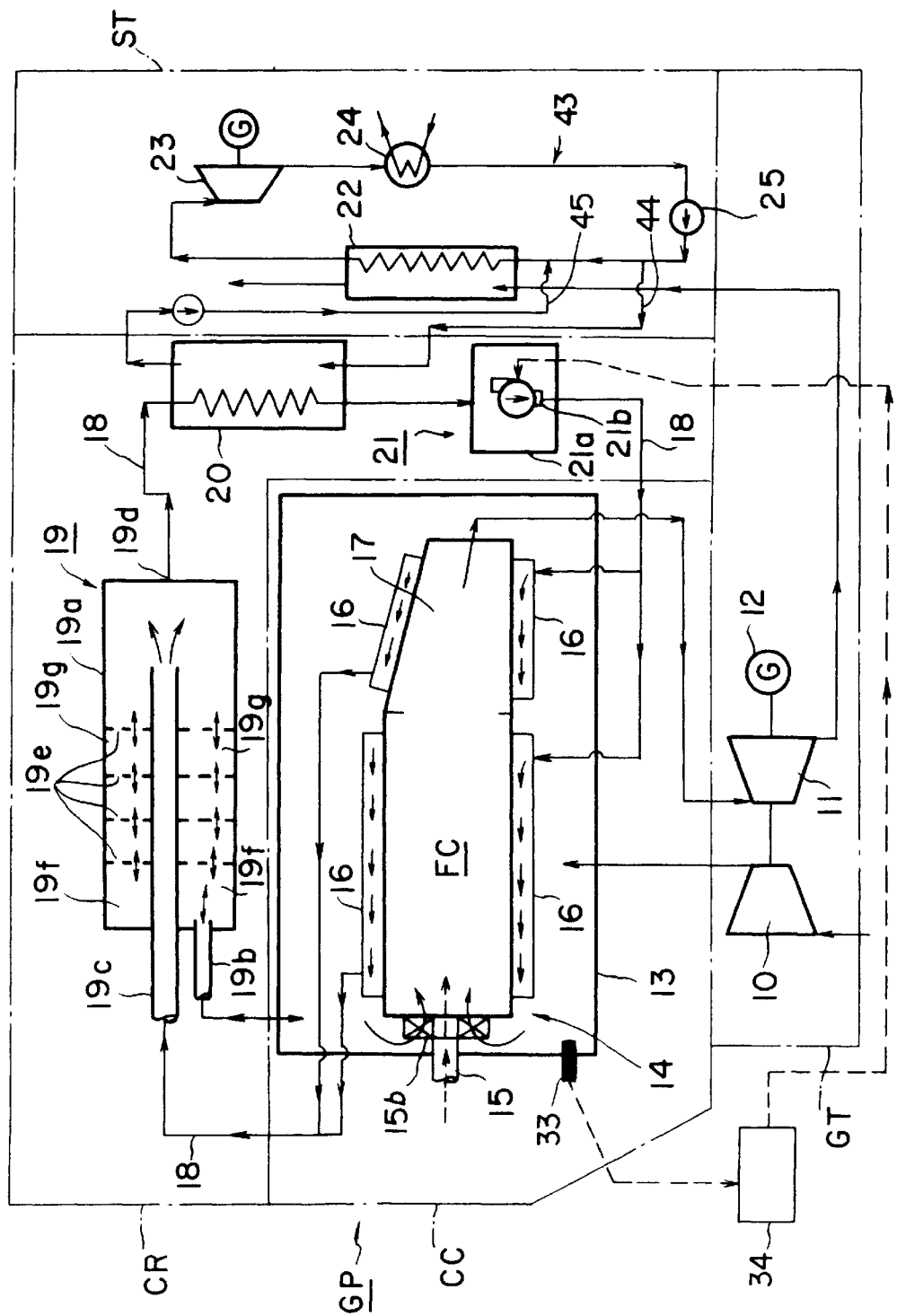
FIG. 12 is a schematic system diagram of a gas turbine plant according to a third embodiment of the present invention.

FIG. 12 is a schematic diagram representing a third embodiment of a gas turbine plant according to the present invention.

This third embodiment has a structure for automatically operating a blower accommodated in the blower unit 21 of the cooling air circulation system CR.

Referring to FIG. 12, a pressure sensor 33 for detecting a inner pressure variation of the casing 13 of the gas turbine combustor system CC is provided for the casing 13. The pressure sensor 33 operates to send a detection signal to a function generator 34 when the inner pressure varies and a signal corresponding to the detection signal is selected, which is sent as an operation signal to drive the blower 21b. Accordingly, when the inner pressure in the casing 13 varies due to, for example, the load change, a signal representing the change is detected by the pressure sensor 33 and the detection signal is selected as the operation signal for the blower 21b by the function generator 34. Thus, the blower 21b can be quickly operated in accordance with the inner pressure change of the casing 13 and the inner cylinder 14 can be cooled effectively with good timing.

Figure 13:
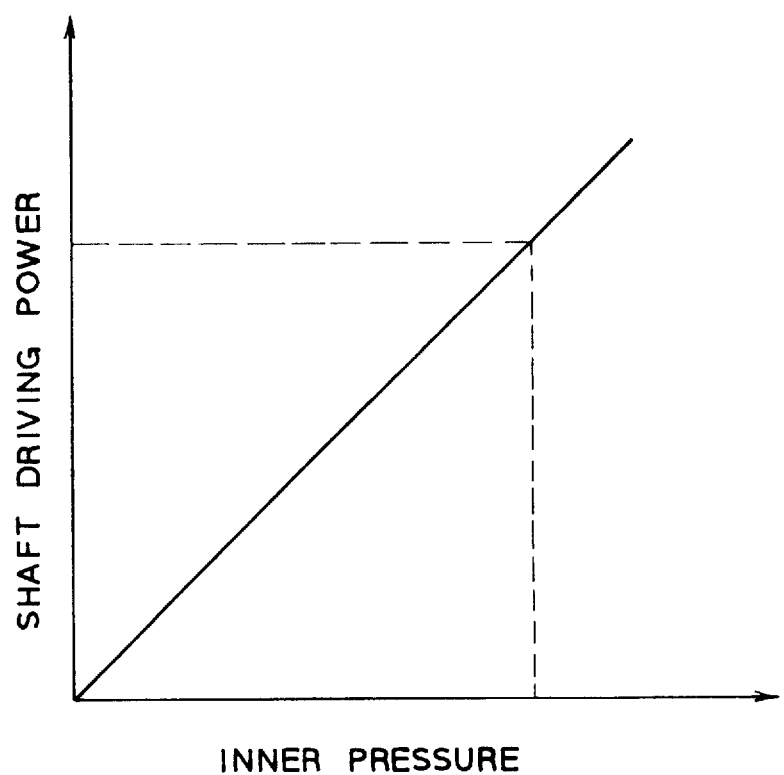
FIG. 13 is a graph representing a function diagram accommodated in a function generator.
Figure 14:
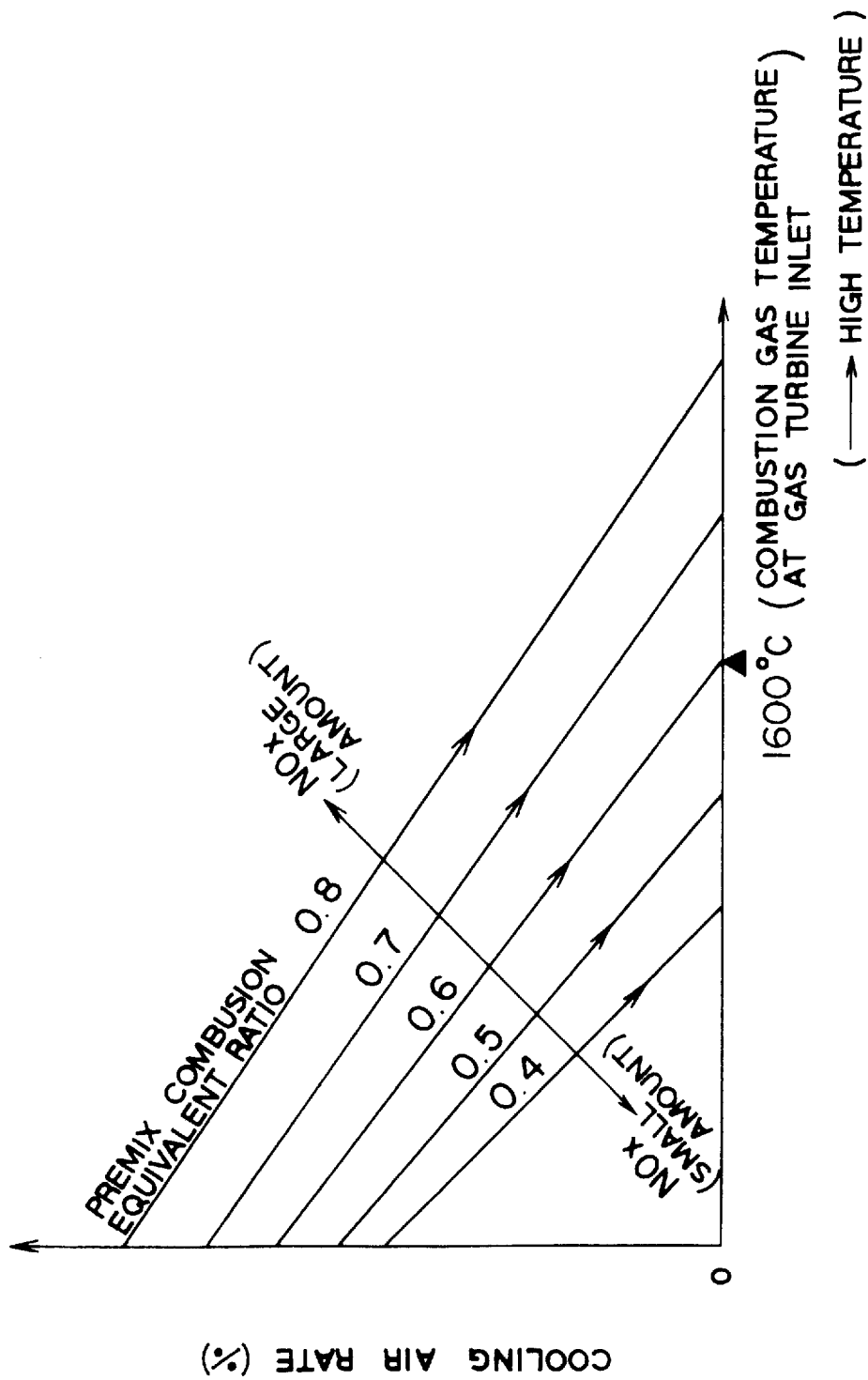
FIG. 14 is a graph representing a characteristic diagram showing a relationship between a combustion gas temperature and a cooling air rate with a premix fuel equivalent ratio being a parameter.

FIG. 13 is a graph showing a function diagram incorporated in the function generator 34, and the axis of abscissa represents the detection signal of the pressure sensor 33 and the axis of ordinate represents a shaft power signal as the operation signal of the blower 21b.

The volume flow rate of the cooling air circulated by the operation of the blower 21b can perform sufficient wall surface cooling under the whole operating or running condition, so that the volume flow rate is controlled such that the cooling air flow speed in the cooling passages 16, 16 is substantially constant. In the case of the constant flow speed, the weight flow rate of the cooling air supplied from the blower 21b is increased or decreased in proportion to the inner pressure of the cooling passages 16, 16.

Further, the driving power of the blower 21b is proportional to the weight flow rate of the cooling air. That is, in order to cool the wall surface, the driving power of the blower in proportion to the inner pressure of the cooling passages 16, 16 is required.

As shown in FIG. 13, according to the present embodiment, the sufficient cooling condition corresponding to the whole operation condition can be established by using the shaft driving power signal (ordinary axis) in proportion to the inner pressure (abscissa axis). In addition, the proper operation can be realized by the required minimum driving power of the blower 21b corresponding to the operation condition (i.e. inner pressure of the cooling passages 16, 16).

As can be understood from the above embodiments of the gas turbine plant of the present invention, it is possible to provide a gas turbine plant capable of effectively utilizing the limited high pressure air from a compressor as the cooling air with the reduced pressure loss and effectively cooling the gas turbine combustor.

Further, it is to be noted that the present invention is not limited to the described embodiments and many other changes or modifications may be made without departing from the scopes of the attached claims.

For instance, the examples of the cooling air passages and the transition pieces described with reference to the first embodiment of the gas turbine plant will be applicable to the second and third embodiments thereof with no specific problem for constituting the gas turbine plant by those skilled in the art.

What is claimed is:

1. A gas turbine plant comprising:

a gas turbine system provided with a compressor, a gas turbine and a generator which are mounted on a common shaft and operatively connected in series to each other;

a gas turbine combustor system including a gas turbine combustor composed of an outer casing and an inner cylinder accommodated in the casing; and a cooling air circulation system operatively connected to the gas turbine combustor system for circulating a cooling air, wherein a cooling passage means is disposed along an outer peripheral surface of the inner cylinder and a circulating line is disposed for circulating cooling air in the cooling passage means at sufficient pressure to balance the pressure within the casing of the gas turbine combustor and wherein said cooling air circulation system includes an equalizer header unit for supplying the cooling air in the cooling passage means to the circulation line, a heat exchanger unit for re-cooling the cooling air from the equalizer header unit and a blower unit for returning the cooling air to the cooling passage means after the re-cooling.

2. A gas turbine plant according to claim 1, wherein said inner cylinder is composed of a combustion section and a transition piece section and said cooling passage means is applied to at least one of said combustion section and said transition piece section of the inner cylinder.

3. A gas turbine plant according to claim 1, wherein said inner cylinder is formed with film cooling holes through which the cooling air in the cooling passage means and a high pressure air in the casing are guided in shape of film.

4. A gas turbine plant according to claim 1, wherein said equalizer header unit is composed of a closed chamber having one and another longitudinal end portions, an equalizer duct disposed to one end portion of the closed chamber so as to communicate with the casing of the gas turbine combustor, a cooling air duct disposed to one end portion the the closed chamber so as to communicate with the cooling passage means, and an outlet formed to the another end portion of the closed chamber so as to feed the cooling air passing through the cooling air duct to the circulation line.

5. A gas turbine plant according to claim 1, further comprising a steam turbine system operatively connected to the cooling air circulation system, wherein a cooling medium supplied, through the steam turbine system, to the heat exchanger unit of the cooling air circulation system is either one of condensed water, supply water, sea water and fuel.

6. A gas turbine plant according to claim 5, wherein said heat exchanger unit is operatively connected to the steam turbine system through a supply tube through which the cooling medium is supplied and a recovery tube through which a heated cooling medium is returned to the steam turbine system.

7. A gas turbine plant according to claim 1, wherein a cooling medium supplied to the heat exchanger unit of the cooling air circulation system is a cooling water from another gas turbine plant.

8. A gas turbine plant according to claim 1, wherein said cooling passage means is divided into an inlet chamber and an outlet chamber by a partition plate extending in a direction along the cooling air flow direction in the cooling passage means and formed with air jetting holes through which the cooling air flows from the inlet chamber towards the outlet chamber and the inlet and outlet chambers are mounted with manifolds, respectively.

9. A gas turbine plant according to claim 1, wherein said cooling passage means is divided into an inlet chamber and an outlet chamber by a partition plate extending in a direction along the cooling air flow in the cooling passage means so as to provide a reverse cooling passage in which the cooling air from the inlet chamber flows in the outlet chamber in a direction reverse to a flow direction in the inlet chamber and the inlet and outlet chambers are mounted with manifolds, respectively.

10. A gas turbine plant according to claim 1, wherein said cooling passage means is provided with turbulent flow accelerating means formed to an outer peripheral surface of the inner cylinder.

11. A gas turbine plant according to claim 10, wherein said turbulent flow accelerating means comprises either one of a plurality of ribs and fins disposed with a space from each other.

12. A gas turbine plant according to claim 11, wherein each of said ribs or fins has a tree-shaped structure, along the cooling air flow, composed of a main piece and a plurality of branched pieces branched from the main piece.

13. A gas turbine plant according to claim 1, wherein said cooling passage means is formed of a member expandable and contractible in accordance with thermal expansion and contraction of the inner cylinder and a seal ring is disposed to one end portion of the cooling passage means to be movable.

14. A gas turbine plant according to claim 1 wherein said equalizer header unit is provided with a closed chamber which is divided into a plurality of sections which are separated by perforated partition plates.

15. A gas turbine plant according to claim 1, wherein said blower unit is provided with a closed chamber for achieving a pressure balance to the equalizer header unit and a blower is disposed in said closed chamber.

16. A gas turbine plant according to claim 1, further comprising a pressure sensor disposed to said casing of the gas turbine combustor and a function generator operatively connected to said pressure sensor and said blower unit to operate said blower unit in response to a pressure change in said casing.

17. A gas turbine plant according to claim 16, wherein said pressure sensor is incorporated in said cooling air circulation line.

* * * * *